C. H. Jackson,
Water Filter,
N° 85,449. Patented Dec. 29, 1868.

Witnesses:
H. Pauly
R. Simon

Inventor:
Chas. H. Jackson

CHARLES H. JACKSON, OF ST. LOUIS, MISSOURI.

Letters Patent No. 85,449, dated December 29, 1868; antedated December 17, 1868.

IMPROVEMENT IN FILTERS.

The Schedule referred to in these Letters Patent and making part of the same.

*To all whom it may concern:*

Be it known that I, CHARLES H. JACKSON, of St. Louis, in the county of St. Louis, and State of Missouri, have made certain new and useful Improvements in Filters; and I do hereby declare that the following is a full and clear description thereof, reference being had to the accompanying drawings, and to the letters of reference marked thereon.

The nature of this invention consists in providing a central chamber for the filtered water, which chamber may also be used for a cooler, the said chamber being surrounded by an annular filtering-chamber, through which the water filters downward, and enters the clear-water chamber at the bottom.

To enable those skilled in the art to make and use my improved filter, I will proceed to describe its construction and operation.

Figure 1:
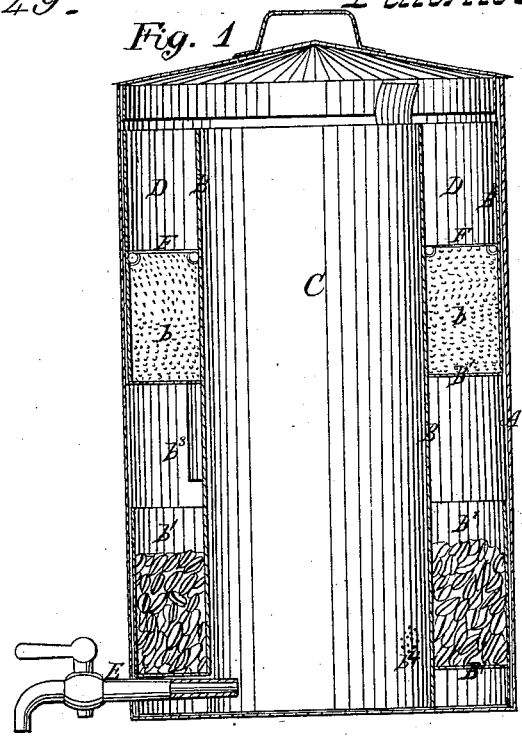

Figure 1, of the drawings, is a central sectional elevation of the improved filter.

Figure 2:
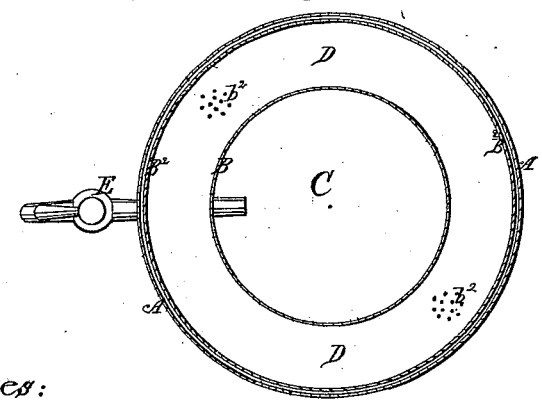

Figure 2 is a sectional plan of the same, taken on the line $x-y$ of fig. 1.

A is the outer wall of the filter, which, for convenience and economy's sake, is made circular in form.

It is evident, however, that any other form would be equally well adapted for the contour of the filter; consequently the circular form only will be described.

Within the outer wall A, and concentric with it, is another vertical wall, B, which subdivides the interior into two vertical compartments, C and D.

The inner one of these compartments, C, is the clear-water chamber, and, at the same time, serves as a cooler.

The annular chamber D surrounds the said chamber C, and extends from the top to the bottom of the apparatus.

The chamber D may be of a width of, say, two or three inches, more or less.

Attached to the exterior of the wall B are to be two or more horizontal walls, $B^1$, annular in plan, and having vertical walls, $B^2$, attached to their peripheries, the said vertical walls being concentric with the walls A and B, and just far enough removed from the former to allow the inner vessel B $B^1$ $B^2$ to be easily set into or removed from the enclosing-vessel A.

This construction of the said walls B $B^1$ $B^2$ forms filtering-chambers $b$ $b^1$. Into the upper one (or ones, if more than two be used,) gravel or sand will be placed, and into the lower one, charcoal. The unfiltered water will be poured into the upper part of the chamber D, above the filter $b$, and will pass down through the said filter, and through the upper one of the bottoms $B^1$, which is perforated in one or two places, as at $b^2$ in fig. 2, and thence down into and through the filter $b^1$ in the same manner.

Small tubes or spouts, $b^3$, should be used to conduct the water from the perforations $b^2$ of the upper filter, down into the next lower one, in order to prevent slopping the water into the passage between the walls A and $B^1$.

An annular strainer, F, is to be placed over the top of the filter $b$, to catch the bulk of the sediment.

This strainer may be constructed of coarse woollen cloth, or wire cloth, and may very easily be removed and washed, without disturbing the filtering-material in $b$ and $b^1$. This renders the filter peculiarly applicable to filtering very muddy water.

The inner chamber C, into which the clear water runs through the apertures $b^4$ from the filter $b^1$, is well adapted to the purposes of a cooler, as it is protected from external heat by means of the annular chamber D and its contents.

From the reservoir or cooler C, the clear, cool water may be drawn through the faucet E.

Having described my invention,

What I claim, is—

The vessels A and B $B^1$ $B^2$, when constructed with the filtering-chambers $b$ and $b^1$, and otherwise arranged, as herein shown and described.

CHAS. H. JACKSON.

Witnesses:
M. RANDOLPH,
GEO. W. HERBERT.